United States Patent
Mejia et al.

(10) Patent No.: US 7,236,446 B2
(45) Date of Patent: Jun. 26, 2007

(54) COMPENSATING FOR VARIATIONS IN THE TEMPERATURE OF A PROBE OF A STORAGE DEVICE

(75) Inventors: Robert G. Mejia, Boise, ID (US); Richard L. Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 586 days.

(21) Appl. No.: 10/898,122

(22) Filed: Jul. 23, 2004

(65) Prior Publication Data

US 2006/0028964 A1     Feb. 9, 2006

(51) Int. Cl.
*G11B 9/00* (2006.01)
(52) U.S. Cl. .................................... 369/126
(58) Field of Classification Search .............. None
See application file for complete search history.

(56) References Cited

U.S. PATENT DOCUMENTS

| | | | |
|---|---|---|---|
| 5,345,815 A | | 9/1994 | Albrecht et al. |
| 5,432,771 A | * | 7/1995 | Shido et al. ................. 369/126 |
| 5,546,374 A | * | 8/1996 | Kuroda et al. .............. 369/126 |
| 5,835,477 A | | 11/1998 | Binnig et al. |
| 5,856,967 A | | 1/1999 | Mamin et al. |
| 6,233,206 B1 | | 5/2001 | Hamann et al. |
| 6,249,747 B1 | * | 6/2001 | Binnig et al. ................ 369/126 |
| 6,370,107 B1 | | 4/2002 | Hosaka et al. |
| 6,473,361 B1 | | 10/2002 | Chen et al. |
| 6,757,235 B2 | * | 6/2004 | Wickramasinghe et al. . 369/126 |
| 6,950,385 B1 | * | 9/2005 | Chiba et al. ................. 369/126 |
| 2004/0114490 A1 | * | 6/2004 | Antonakopoulos et al. . 369/126 |
| 2005/0047307 A1 | * | 3/2005 | Frommer et al. ........... 369/126 |
| 2005/0259503 A1 | * | 11/2005 | Hilton ........................ 365/232 |

OTHER PUBLICATIONS

Vettiger and Binnig, Scientific American, "The Nanodrive Project," pp. 47-51, 53 (Jan. 2003).

* cited by examiner

*Primary Examiner*—Thang V. Tran (57) ABSTRACT

A storage device includes a storage medium and a probe to form perturbations in the storage medium. The storage device further includes a circuit to cause heating of the probe to perform an access operation, the circuit to compensate for variations in a temperature of the probe in performing the access operation.

28 Claims, 5 Drawing Sheets

COMPENSATING FOR VARIATIONS IN THE TEMPERATURE OF A PROBE OF A STORAGE DEVICE

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0."

To perform a write operation, the probe of a probe-based storage device is heated to some predetermined temperature. Heating of the probe causes the tip of the probe to heat up to a write temperature that is high enough to soften the surface of the storage medium, thus imprinting a dent in the storage medium. However, it usually takes some amount of time to heat up the probe tip to the desired write temperature. During the initial stages of a write operation after some period of inactivity, the temperature of the probe tip may not be at the optimal write temperature. As a result, writing of the first few bits of data on a storage medium after some period of inactivity may be performed at a temperature that is less than the optimal level. Temperature variations of the probe tip can also occur between regions of the storage medium with a high density of dents and regions with a low density of dents. When writing to a region with a high density of dents, the probe tip is usually hotter than when the probe is writing to a region with a low density of dents.

Such variations in the temperature of the probe tip can lead to variations in the quality of dents formed in the storage medium. In areas of the storage medium where writing occurs at a temperature less than the optimal write temperature, appropriately sized dents may not be formed because the probe may not be hot enough to deform a desired amount of the storage medium. The improperly formed dents can be difficult to detect accurately during read operations. As a result, read errors may occur.

DETAILED DESCRIPTION

Figure 1:
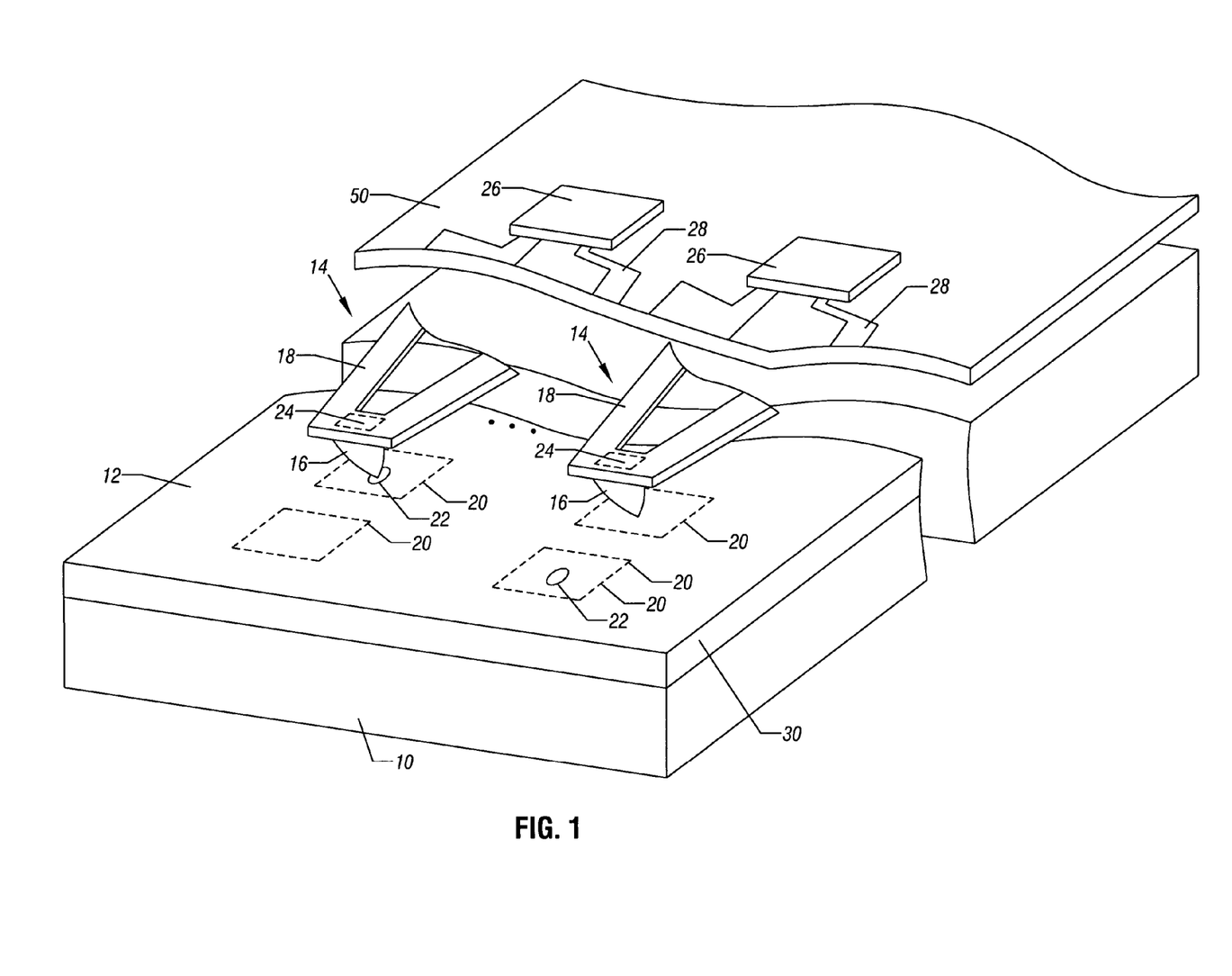
FIG. 1 illustrates a portion of a probe-based storage device that includes a probe for reading data from and writing data onto a storage medium and that incorporates circuitry to perform temperature compensation according to some embodiments of the invention.

FIG. 1 shows an example probe-based storage device that includes a storage substrate 10 that provides a storage medium. As used here, the term "storage medium" refers to any medium in which storage cells are capable of being formed. As depicted in FIG. 1, the storage medium is made up of a layer 30 that is part of the storage substrate 10.

The layer 30 has a storage surface 12 on which perturbations (such as dents 22) can be formed by tips 16 of respective probes 14 in the storage cells 20. A "perturbation" formed on a storage medium is any disturbance (physical, electronic, chemical, or otherwise) that is created in a particular region of the storage medium to represent a data state. The tip 16 of each probe 14 is attached to and protrudes outwardly from a cantilever 18 of the probe 14. According to some embodiments, each probe 14 is a very small probe (on the order of nanometers) that is built using nanotechnology techniques. Such probes are referred to as nanotechnology probes. The probes are mounted to a probe substrate 50 (a portion of the probe substrate 50 is not shown in FIG. 1 to more clearly illustrate the probes 14).

The cantilever 18 is formed at least in part of an electrically conductive material (e.g., metal, doped silicon, polysilicon, and so forth). The layer 30 is formed of a material that is relatively soft such that the tips 16 of respective probes 14 are able to form dents 22, which are basically pits or holes, in the storage surface 12. Dents 22 are formed in selected storage cells 20. An example material of the layer 30 is polymer (e.g., PMMA or polymethylmethacrylate). Other materials can be used in other implementations.

Instead of forming dents 22 in storage cells 20, other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing tunneling effects to move and remove atoms or charge to or from the medium, or storing/removing charge from a particular region. Such other types of perturbations can also be formed by the probes 14 during write operations, and detected by the probes during read operations.

FIG. 1 shows an array of storage cells 20 formed in the storage medium. Note that a large number of storage cells 20 can be defined in the storage medium, with four such storage cells 20 shown in FIG. 1 for purposes of illustration. In the example shown in FIG. 1, two of the storage cells 20 contain dents 22 formed by tips 16 of the probes 14, while the other two storage cells 20 do not have dents 22. Absence of a dent 22 represents a first storage state, while presence of the dent 22 represents a second storage state. Thus, for example, the presence of the dent 22 represents a logical "1," while the absence of the dent represents a logical "0."

To write to the storage medium, each probe 14 is scanned across the storage surface 12, with the tip 16 heated to a write temperature and contacted to corresponding positions on the storage surface 12 to form corresponding dents 22. To read from the storage medium, the probes 14 are also scanned across the storage surface 12. Detection of whether a dent 22 is present or not in a storage cell can be accomplished by a number of mechanisms.

For example, reading can be performed by detecting a deflection of the probe 14. When the probe 14 is not engaged within a dent 22, the probe 14 is deflected by a first amount. However, if the probe 14 is engaged within a dent 22, then the probe 14 is deflected by a second amount. Another possible way of detecting for dents is by measuring a resistance of the cantilever 18 based on a temperature of the cantilever 18. If a probe tip 16 is engaged in a dent 22, then the cantilever 14 is brought into closer proximity with the storage surface 12, which causes larger thermal communication between the cantilever 18 and the storage surface 12 to reduce the temperature of the cantilever 18. The change in temperature of the cantilever 18 causes its resistance to change.

Another technique for detecting for presence of a dent is by making the layer 30 of the substrate 10 electrically conductive. When a probe tip 16 is engaged within a dent 22, some electrically conductive portion of either the tip 16 or the cantilever 18 can be electrically contacted to the storage surface 12 provided by the layer 30. Detection of the electrical contact enables detection of presence of the dent 22.

Read/write circuits 26 (which may be mounted on the probe substrate 50) are electrically coupled by electrically conductive lines 28 to the probes 14 to perform read and write operations. Each read/write circuit 26 can be electrically coupled to more than one probe 14.

During a write operation in which a dent is to be formed in a storage cell (such as for writing a logical "1" state), current is driven by read/write circuit 26 through the electrically conductive cantilever 18 of a probe 14. A resistive region 24 is provided near the end portion of the cantilever 18. The resistive region 24 is heated by the write current, which in turn causes the probe tip 16 to heat to a write temperature. Note, however, that the probe tip is not heated in a write operation in which a dent is not to be formed in a storage cell (such as for writing a logical "0" state).

For each write pulse, some of the heat energy will flow to the cantilever resulting in a temperature rise. The temperature variations of the cantilever are therefore a function of the write pulses and the thermal time constant of the cantilever. The time constant of the cantilever 18 is usually long enough to span the time taken to write several data bits.

During periods in which a storage device operation is not active, a probe cools to the ambient temperature of the storage device. Similarly, during writes to regions of the storage medium in which low densities of dents are formed, the probe cools to a relatively lower temperature (such as in response to a write of a long stream of "0" data bits). As used here, a "period of inactivity" refers to a period during which a probe is inactive or during which the probe is otherwise not being heated to a write temperature. If the probe tip 16 is allowed to cool after some period of inactivity, then the probe tip 16 may not heat to the target write temperature on the first few writes of data bits immediately after the period of inactivity, as a result of the time constant associated with heating the probe tip. Also, the density of dents affects the probe tip temperature. For example, when writing to ten storage cells, the probe tip temperature may be able to reach a first level if eight dents are formed in the ten storage cells, while the probe tip temperature may reach a second, lower level if two dents are formed in the ten storage cells. In other words, a lower density of dents formed in a group of storage cells may result in a lower probe tip temperature.

The variations in the probe tip temperature during write operations can cause non-uniformities in dents formed by the probe tip. To address this issue, the read/write circuits 26 according to some embodiments are configured to compensate for the temperature variations of the probe tip during an access operation. An "access operation" refers to either a write operation or a read operation. For example, the read/write circuits 26 can vary characteristics of a write signal provided to a probe. The characteristics that can be varied include, for example, either the power of the write signal or the timing of the write signal. More generally, the read/write circuits 26 can vary characteristics of an access signal, which includes either a write signal or a read signal, to compensate for probe tip temperature variations.

Alternatively, to compensate for variations in the probe tip temperature, the first predetermined number of bits written to storage cells after a period of inactivity can be dummy bits. This latter approach, however, consumes a certain amount of storage space since storage cells containing dummy bits do not store meaningful data.

Figure 2:
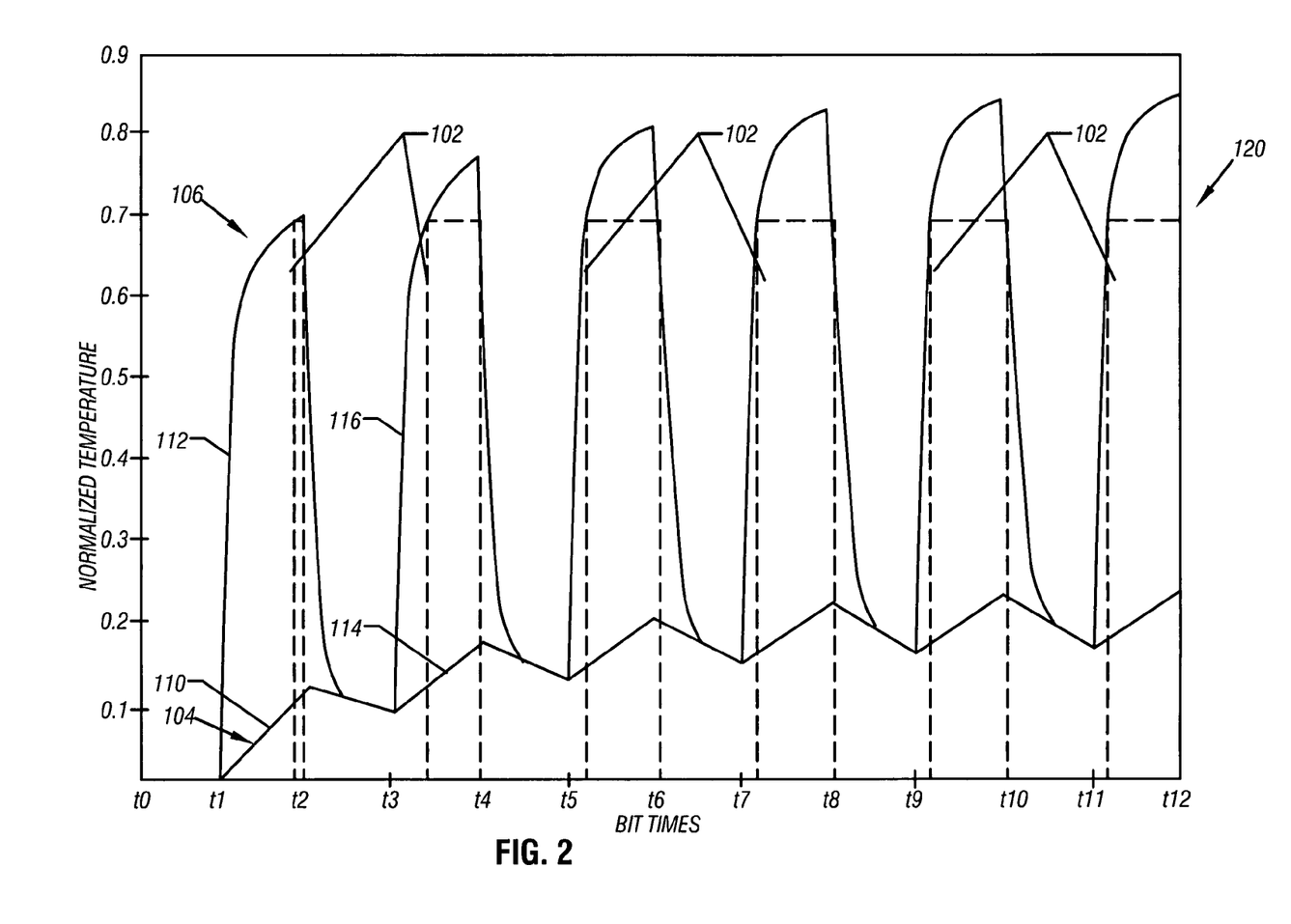
FIG. 2 is a timing diagram to illustrate temperature variations of a probe tip and a probe cantilever when temperature compensation is not applied.

FIG. 2 shows a timing diagram to illustrate temperature variations of a probe cantilever 18 and tip 16 (FIG. 1). In the timing diagram, a write signal (not shown) that is a square waveform is provided to the probe cantilever 18. The write signal is asserted to a predetermined power level at time t1, and falls at time t2; asserted to the predetermined voltage level at time t3, and falls at time t4; asserted to the predetermined voltage level at time t5, and falls at time t6; asserted to the predetermined voltage level at time t7, and falls at time t8; asserted to the predetermined voltage level at time t9, and falls at time t10; and asserted to the predetermined voltage level at time t11, and falls at time t12. A waveform 104 represents a temperature of the probe cantilever 18, while a waveform 106 represents a temperature of the probe tip 16. Note that during a write operation, the current flowing through the cantilever 18 causes the cantilever 18 to heat up by some amount.

Initially, after some period of inactivity, the cantilever temperature (waveform 104) and the probe tip temperature (waveform 106) are at or near the ambient temperature of the storage device (which occurs between times t0 and t1). In response to the rising edge of the write signal at time t1, the probe cantilever and the probe tip temperatures start to rise, as indicated by rising edge 110 of the waveform 104 and the rising edge 112 of the waveform 106. On the falling edge of the write signal at time t2, both the cantilever temperature and the tip temperature start falling. In response to the next rising edge of the write signal (at time t3), the cantilever temperature starts to rise again (as indicated by rising slope 114 of the waveform 104). Also, the probe tip temperature also starts rising (as indicated by rising slope 116 of the waveform 106). This pattern is repeated with each pulse of the write signal. Note that although the cantilever temperature falls with each falling edge of the write signals, the cantilever temperature does not fall back to the original ambient (or near ambient) temperature.

With each write signal pulse, the peak probe cantilever temperature of the waveform 104 steadily increases until the temperature reaches an equilibrium level, as depicted in FIG. 2. The same is true also of the probe tip temperature. The peak probe tip temperature for writing the first three bits in FIG. 2 is lower than the peak probe tip temperature for writing the last three data bits in FIG. 2.

The probe tip is effective for forming a dent once the probe tip rises above a predetermined threshold temperature, indicated by level 120 in FIG. 2. In FIG. 2, the effective write waveform (which is the waveform representing time periods during which dent formation is effectively being performed) is represented by 102. The first pulse of the effective write waveform 102 is relatively narrow, which is a result of the probe tip temperature reaching a relatively low peak level with the write of the first data bit. However, as the write operation progresses, the peak probe tip temperature steadily increases, which causes the pulse width of the effective write waveform 102 to increase.

The variation in the probe tip temperature is caused by variation in the cantilever temperature. A warmer cantilever results in the probe tip temperature reaching a threshold temperature earlier and falling below the threshold temperature later, which provides an effectively wider temperature pulse. A "threshold temperature" refers to a temperature at which the probe tip is able to effect formation of a dent. On the other hand, a cantilever being at a lower temperature results in the probe tip temperature reaching a threshold temperature later and falling below a threshold temperature earlier (for a narrower temperature pulse). Consequently, the first few dents formed by the series of write signal pulses shown in FIG. 2 are likely to be shallower than and not as well defined as dents formed by the later write signal pulses. Also, because the leading edge of the write signal pulse is affected more than the trailing edge of the write signal pulse, a dent formed by a probe with a cantilever at a lower temperature is formed later, such that the center of the dent is shifted with respect to a dent that would have been formed by a probe with a cantilever at a normal temperature.

Figure 3:
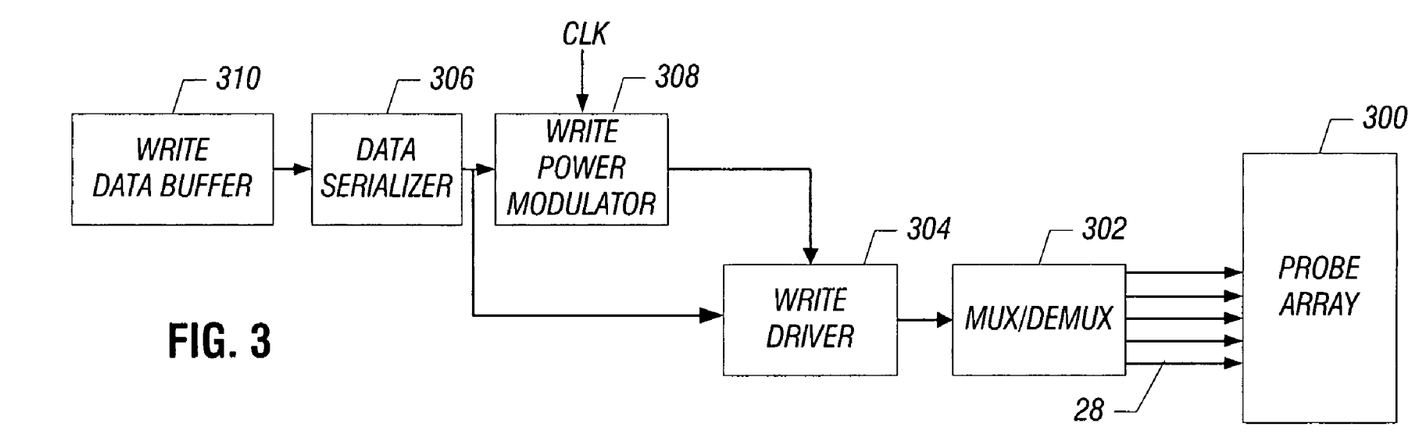
FIG. 3 is a block diagram of a write circuit that compensates for variations in the temperature, in accordance with an embodiment of the invention.
Figure 4:
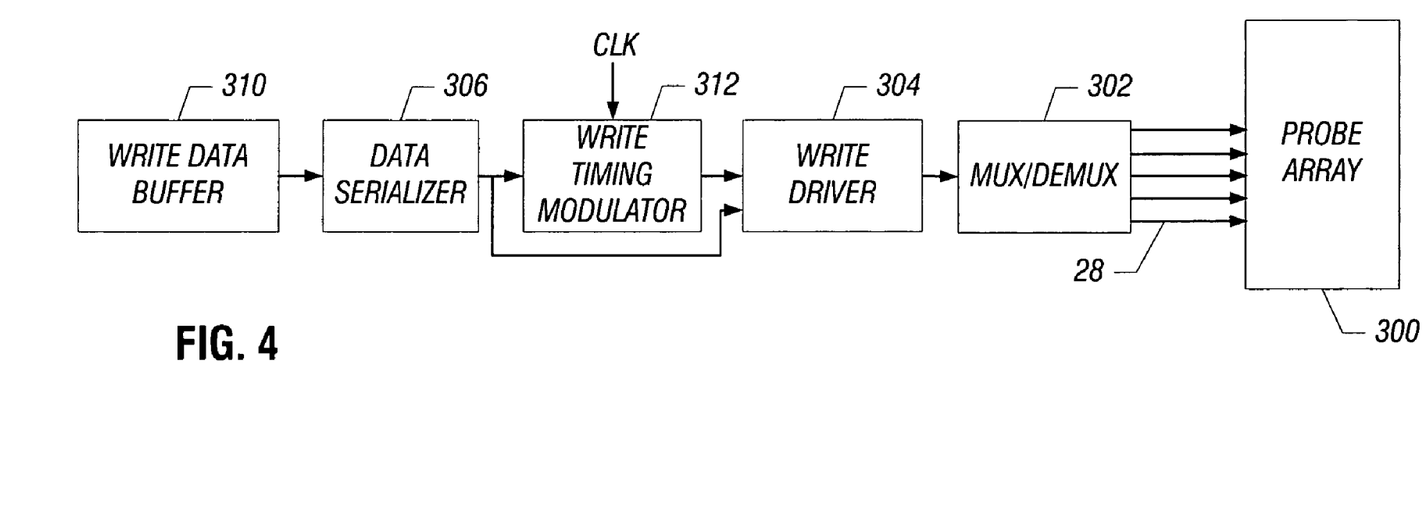
FIG. 4 is a block diagram of a write circuit that compensates for variations in the probe temperature, in accordance with another embodiment.

FIG. 3 illustrates a write circuit that includes a compensation mechanism according to a first embodiment to compensate for variations in probe tip temperature, while FIG. 4 illustrates a write circuit that includes a compensation mechanism according to another embodiment.

The write circuit of FIG. 3 (which is part of the read/write circuit 26 shown in FIG. 1) is part of a channel of the storage device. The storage device is divided into multiple channels, with one write circuit provided for each channel. Each channel typically includes a plurality of probes, which are part of a probe array 300. Each probe array 300 includes a subset of all the probes of the storage device. A multiplexer/demultiplexer 302 is connected to the probe array 300 over signal lines 28. A write driver 304 provides a write signal to the multiplexer/demultiplexer 302, which drives the write signal over one of the signal lines 28 to a selected one of the probes in the probe array 300.

The write driver 304 receives an input from a data serializer 306, and another input from a write power modulator 308. Data bits provided by the data serializer 306 to the write driver 304 causes the write driver either to generate a write signal pulse (in response to a logical "1" data bit) or to not generate the write signal pulse (in response to a logical "0" data bit). The data serializer 306 serializes data bits received in parallel from a write data buffer 310. The data serializer 306 provides the data bits as a serial stream to the write power modulator 308 and write driver 304.

The write power modulator 308 provides a control indication to the write driver 304 that controls the power of the write signal driven by the write driver 304. The power of the write signal can be varied, for example, by varying either the amplitude of the electrical current or electrical voltage of the write signal pulse driven by the write driver 304. The write power modulator 308 keeps track of the data pattern (from the data serializer 306) that is written to the probe array 300. The write power modulator 308 modulates the amount of power of the write signal to be driven by the write driver 304 to compensate for variations in probe tip temperature that is expected due to the write data pattern.

The write power modulator 308 controls the power of each write signal pulse based on the extent of inactivity (or activity) of a given probe. A period of inactivity can be measured as the number of clock periods (the number of periods of the CLK signal received by the write power modulator 308) during which the probe tip has not been heated to form a dent. If the probe tip has been inactive for N CLK periods, where N is a predetermined number, then the write power modulator 308 causes elevated power to be applied to the first number of write signal pulses generated by the write driver 304 immediately after the period of inactivity. A write signal pulse of elevated power causes both the cantilever temperature and the probe tip temperature to rise more quickly and to a higher level than in response to a write signal pulse of normal power.

Following a period of inactivity, the write power modulator 308 causes the first write current pulse (for a first data bit) after the period of inactivity to have a first elevated level of power. The power of the write signal pulse can be decreased for the second bit after a period of inactivity, since the cantilever temperature would have heated up by some amount after writing of the first data bit. The power of the write signal pulse is dropped further for the third data bit after the period of inactivity. The incremental dropping of the current of the write signal pulse continues until an equilibrium is reached, which is usually after some predefined number of writes that cause formation of a dent. After equilibrium has been reached, the write power modulator 308 causes the write signal pulses to have normal power.

Moreover, the write power modulator 308 can also adjust for variations of density of dents, which may affect probe tip temperature. To adjust for variations in dent density, the write power modulator looks at the previous N data bits that were written, where N is a predefined number based on the time constant of the cantilever. The write power modulator 308 calculates a weighted sum of the number of dents formed in the previous N data bits. In one implementation, the weighted sum is based on weights assigned to each of the previous N data bits, with greater weight assigned to dents formed closer in time to the current dent to be formed. The write power modulator 308 varies the power of the write signal pulse based on the weighted sum.

FIG. 4 shows another write circuit that includes a compensation mechanism according to a second embodiment.

The components of the write circuit of FIG. 4 are the same as the components of the write circuit of FIG. 3, except that a write timing modulator 312 is provided in place of the write power modulator 308. The write timing modulator 312 controls the timing of the write signal pulses provided by the write driver 304. To achieve a higher probe tip temperature and cantilever temperature after some period of inactivity, the write timing modulator 312 causes the leading edge of the write signal pulse to be driven high earlier. The timing of the falling edge of the write signal pulse does not change. Effectively, by moving the rising edge of the write current pulse earlier, a greater amount of time is provided for the probe tip temperature and the cantilever temperature to rise to a desired level. In an alternative implementation, instead of moving the rising edge of the write signal pulse to an earlier time, the falling edge of the write signal pulse can be moved to a later time, which also effectively increases the width of the write signal pulse. Note that since temperature variation affects the leading edge more than the trailing edge of the probe tip temperature, varying the timing of the leading edge of the write signal pulse provides a greater impact. In either case, increased temperature can be achieved at the probe tip and cantilever to compensate for temperature variations. The timing shifts of the write signal pulses can be provided by using a multi-phase write clock generator in the write timing generator 312, in accordance with one example implementation.

The timing shifts are based on the extent of inactivity. If inactivity of greater than N CLK periods, where N is a predetermined number, is detected, the write timing modulator 312 causes the rising edge and/or falling edge of the write signal pulse to be shifted to provide a wider write signal pulse. For the first data bit immediately after the period of inactivity, the rising edge and/or falling edge is shifted by a first amount. For subsequent data bits, the rising/falling edge is shifted by incrementally smaller amounts until equilibrium is reached, at which time no shifting of the rising/falling edge of the write signal pulse is performed. Also, as described above, a weighted sum can be calculated by the write timing modulator 312 to compensate for variations in dent density in the previous N data bits.

The process of performing temperature compensation in a write circuit according to the above embodiments is thus generally as follows. The modulator (either the write power modulator 308 or write timing modulator 312) detects for inactivity. Based on the extent of inactivity, the modulator provides a control indication to the write driver to cause the write driver 304 (FIG. 3 or 4) to provide a write signal pulse that has varied power or timing (or both power and timing) to enable a more uniform temperature to be achieved at a probe tip and cantilever. The increase in power and timing can be proportional to the extent of inactivity. For example, if a probe has been inactive for a long period of time, then it is likely that the cantilever temperature would be much closer to the ambient temperature than if the probe has been inactive for a shorter period of time. Thus, the adjustment of the power or timing is proportional to the extent of inactivity to avoid driving the temperature to much higher than the desired write temperature level. The variation in power and timing can also be based on a weighted sum representing a density of dents in a previous N data bits.

In some implementations, the temperature compensation mechanism discussed herein may be triggered at the beginning of a write to a new or different sector or other segment of the storage device. Note that a storage device can be divided into multiple segments (such as sectors). When starting a write in a new segment, the probe will have to be moved, which causes the probe to be inactive for the duration of the probe movement. The inactivity can lead to cooling of the probe.

In an alternative embodiment, instead of varying the power or timing of the write signal pulse, the write circuit includes a control module (which replaces either the write power modulator 308 or write timing modulator 312) that monitors for a period of inactivity of a predetermined extent. In response to detecting the period of inactivity of the predetermined extent, the control module causes dummy bits to be written to storage cells that are located in predefined areas, such as at the beginning of a sector or a write segment, prior to resuming a write operation. These storage cells containing dummy bits are tracked so that their content can be ignored during read operations. Writing of dummy bits allows time for the probe to be heated to a desired temperature level for reliable dent formation.

Figure 5:
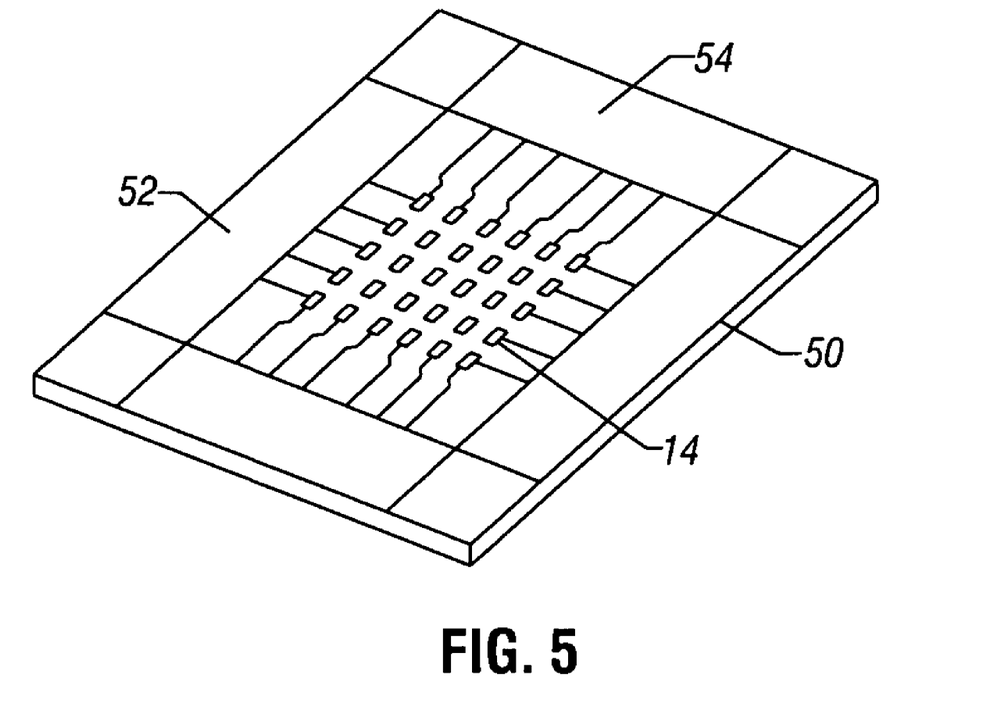
FIG. 5 is a schematic diagram of a probe substrate containing an array of probes and peripheral circuitry to interact with such probes in the probe-based storage device of FIG. 1.

FIG. 5 illustrates the probe substrate 50 that includes an array of probes 14 formed in the probe substrate 50. Peripheral circuitry 52 and 54 are provided on the peripheral sides of the probe substrate 50. The peripheral circuitry 52 and/or 54 includes the read/write circuits 26 of FIG. 1. Alternatively, to provide greater space on the probe substrate 50, the read/write circuits 26 are moved elsewhere in the storage device, such as onto another support structure (not shown). In this alternative implementation, multiplexers of the read/write circuits may be provided on the probe substrate 50, while the remainder of the read/write circuits are moved elsewhere. A row of probes 14 may be activated by the select lines to read from or write to storage cells that the probes are in contact with. This structure enables concurrent access of multiple cells in one operation, which improves access speeds.

Figure 6:
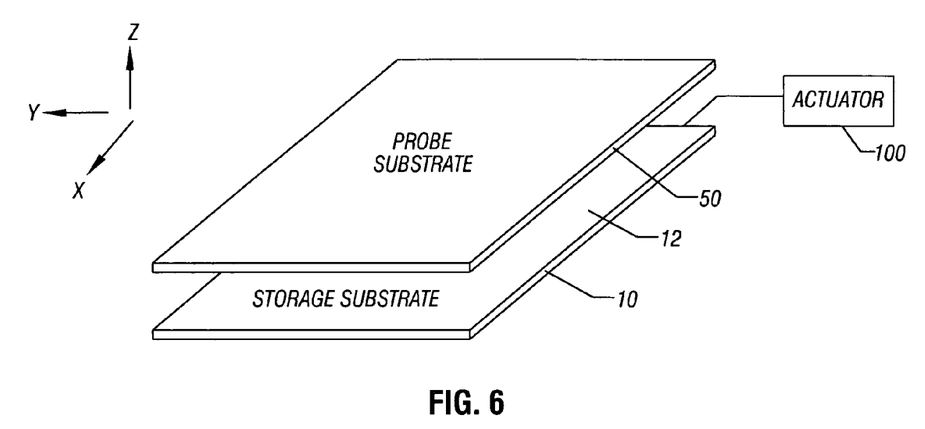
FIG. 6 illustrates the probe substrate positioned to face the storage substrate in the probe-based storage device of FIG. 1.

As shown in FIGS. 1 and 6, the probe substrate 50 is placed with the surface containing the probes 14 facing the storage surface 12 of the storage substrate 10, on which the storage cells are formed. The probe substrate 50 is positioned over the storage substrate 10 so that the probe tips 16 (FIG. 1) point downwardly to engage the storage surface 12 of the storage substrate 10. In an alternative arrangement, the storage substrate 10 is positioned over the probe substrate 50 so that the probe tips 16 point upwardly to face the storage surface 12.

The storage substrate 10, in the example of FIG. 6, is coupled to an actuator 100 that is designed to move the storage substrate 10 in both X and Y directions such that probes 14 (FIG. 1) can be placed over desired storage cells on the storage medium.

Alternatively, the actuator 100 is operatively coupled to move the probe substrate 50, or to move both the probe substrate 50 and the storage substrate 10. The actuator 100 may also be able to move the probe substrate 50 and/or the storage substrate 10 in the Z direction, which is generally perpendicular to the X and Y directions.

Figure 7:
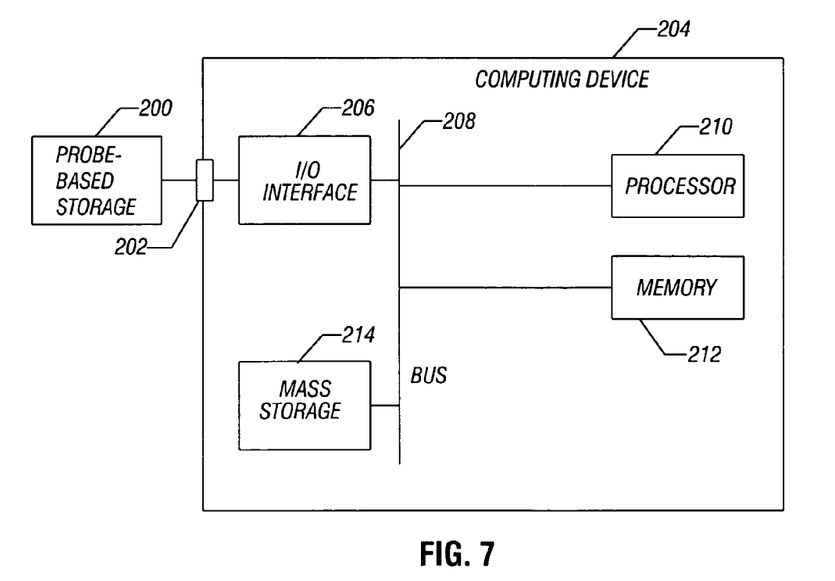
FIG. 7 is a block diagram of a system that includes a computing device having a port to connect to a probe-based storage device incorporating an embodiment of the invention.

The probe-based storage device can be packaged for use in a computing system. For example, as shown in FIG. 7, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
 a storage medium;
 a probe to form perturbations in the storage medium; and
 a circuit to cause heating of the probe to perform an access operation,
 the circuit to compensate for variations in a temperature of the probe in performing the access operation.

2. The storage device of claim 1, wherein the circuit includes a modulator to cause at least one of varying a power of an access signal and varying of a timing of the access signal to compensate for variations in the temperature of the probe.

3. The storage device of claim 2, wherein the access signal comprises a write signal provided to the probe, the modulator to cause at least one of varying of the power of the write signal and varying of the timing of the write signal.

4. The storage device of claim 3, wherein the circuit further comprises a write driver to generate the write signal, the modulator to provide the indication to the write driver to cause at least one of varying of the power of the write signal and varying of the timing of the write signal.

5. The storage device of claim 4, wherein the probe has an electrically conductive portion and a resistive region electrically connected to the electrically conductive portion, the write signal to be provided over the electrically conductive portion to the resistive region.

6. The storage device of claim 5, wherein the probe has a tip to form the perturbations in the storage medium, the perturbations comprising dents, the resistive region to cause heating of the tip in response to the write signal.

7. The storage device of claim 3, wherein the modulator determines an extent of inactivity of the probe in performing formation of perturbations in the storage medium, the modulator to cause variation of the power of the write signal or variation of the timing of the write signal based on the extent of inactivity.

8. The storage device of claim 3, wherein the modulator is adapted to determine a density of perturbations in previous N storage cells of the storage medium that were written to, wherein N is a predetermined number,
 the modulator to cause variation of the power of the write signal or variation of the timing of the write signal based on the determined density of perturbations in the previous N storage cells.

9. The storage device of claim 8, wherein the modulator is adapted to calculate a weighted sum based on the density of the perturbations in the previous N storage cells, the modulator to cause variation of the power of the write signal or variation of the timing of the write signal based on the weighted sum.

10. The storage device of claim 1, further comprising:
 additional probes to form perturbations in the storage medium; and
 additional corresponding circuits to cause heating of the additional probes to perform access operations,
 each of the circuits to compensate for variations in a temperature of a respective probe in performing an access operation.

11. The storage device of claim 1, wherein the circuit is adapted to detect for a period of inactivity of the probe, and wherein the circuit is adapted to cause writing of dummy data bits to respective storage cells after the period of inactivity prior to resuming a write operation.

12. A method of performing write operations in a storage device, comprising:
 using a probe to form dents on a storage medium in write operations; and
 varying at least one characteristic of write signals to the probe to achieve a more uniform temperature of a portion of the probe during formation of the dents.

13. The method of claim 12, wherein varying at least one characteristic of the write signals comprises varying power of the write signals.

14. The method of claim 12, wherein varying at least one characteristic of the write signals comprises varying timing of the write signals.

15. The method of claim 12, wherein varying at least one characteristic of the write signals comprises varying both power and timing of the write signals.

16. The method of claim 12, further comprising:
 determining an extent of inactivity of the probe in performing formation of dents in the storage medium,
 wherein varying at least one characteristic of the write signals is based on the extent of inactivity.

17. The method of claim 12, further comprising:
 determining a density of dents in previous N storage cells of the storage medium that were written to, wherein N is a predetermined number,
 wherein varying at least one characteristic of the write signals is based on the determined density of dents in the previous N storage cells.

18. The method of claim 17, further comprising calculating a weighted sum based on the density of the dents in the previous N storage cells,
 wherein varying at least one characteristic of the write signals is based on the weighted sum.

19. The method of claim 12, further comprising providing the write signals to the probe to cause heating of the probe.

20. The method of claim 19, wherein varying at least one characteristic of the write signals causes a tip of the probe to achieve a more uniform temperature during formation of dents in storage cells.

21. The method of claim 12, wherein varying at least one characteristic of the write signals is triggered by starting a write in a different segment of the storage device.

22. A system comprising:
 a processor; and
 a storage device coupled to the processor, the storage device comprising:
 a storage medium;
 a probe to form dents in the storage medium during a write operation; and
 a circuit to cause heating of the probe to form the dents during the write operation,
 the circuit to compensate for variations in a temperature of the probe during the write operation.

23. The system of claim 22, wherein the circuit is adapted to provide a write signal to the probe, and the circuit includes a modulator to cause at least one of varying a power of the write signal and varying of a timing of the write signal to compensate for variations in the temperature of the probe.

24. The system of claim 23, wherein the circuit further comprises a write driver to generate the write signal, the modulator to provide an indication to the write driver to cause at least one of varying of the power of the write signal and varying of the timing of the write signal.

25. The system of claim 23, wherein the modulator determines an extent of inactivity of the probe in performing formation of dents in the storage medium, the modulator to cause variation of the power of the write signal or variation of the timing of the write signal based on the extent of inactivity.

26. The system of claim 23, wherein the modulator is adapted to determine a density of dents in previous N storage cells of the storage medium that were written to, wherein N is a predetermined number,
the modulator to cause variation of the power of the write signal or variation of the timing of the write signal based on the determined density of dents in the previous N storage cells.

27. The system of claim 22, wherein the probe comprises a nanotechnology probe.

28. The system of claim 22, wherein the storage medium comprises storage cells, the circuit is adapted to compensate for variations in the temperature of the probe by writing dummy bits to respective storage cells after a period of inactivity prior to resuming a write operation.

* * * * *